United States Patent [19]

Heilig

[11] Patent Number: 5,141,240
[45] Date of Patent: Aug. 25, 1992

[54] WHEELED VEHICLE INCLUDING STEP-TRAVERSING ARRANGMENT

[76] Inventor: Nahum Heilig, 70 Ben Zakai Street, 51490 Bnei Brak, Israel

[21] Appl. No.: 681,028

[22] Filed: Apr. 5, 1991

[51] Int. Cl.$^5$ .................................... B62B 5/02
[52] U.S. Cl. .......................... 280/5.3; 280/304.1; 280/47.27; 414/490
[58] Field of Search ............. 414/444, 490; 180/8.2; 280/5.2, 5.3, 5.32, 42.27, 304.1

[56] References Cited

U.S. PATENT DOCUMENTS

| | | | |
|---|---|---|---|
| 2,834,602 | 5/1958 | Hanson | 280/5.3 |
| 3,055,523 | 9/1962 | Wurn | 280/5.2 X |
| 3,061,323 | 10/1962 | Tittes | 280/5.3 |
| 3,269,478 | 8/1966 | Joslyn | 280/5.2 |
| 3,330,370 | 7/1967 | Morton | 180/8.2 |
| 3,734,518 | 5/1973 | Sawmiller et al. | 280/5.3 |
| 3,896,904 | 7/1975 | Walker | 414/444 X |
| 3,907,138 | 9/1975 | Rhodes | 280/5.3 X |
| 4,057,119 | 11/1977 | Melson | 280/5.3 X |

Primary Examiner—Robert J. Spar
Assistant Examiner—James Keenan
Attorney, Agent, or Firm—Benjamin J. Barish

[57] ABSTRACT

A wheeled vehicle includes a lifting device for lifting the vehicle over a step to be traversed. The lifting device includes a carriage mounted on the vehicle frame for vertical movement with respect thereto, lifting arms carried by the carriage and engageable with the step to be traversed, and a force-multiplying block and tackle assembly carried by the frame and coupled to the carriage for moving the carriage downwardly relative to the frame while the lifting arms engage the top of the step to be traversed to thereby lift the frame over the step.

18 Claims, 4 Drawing Sheets

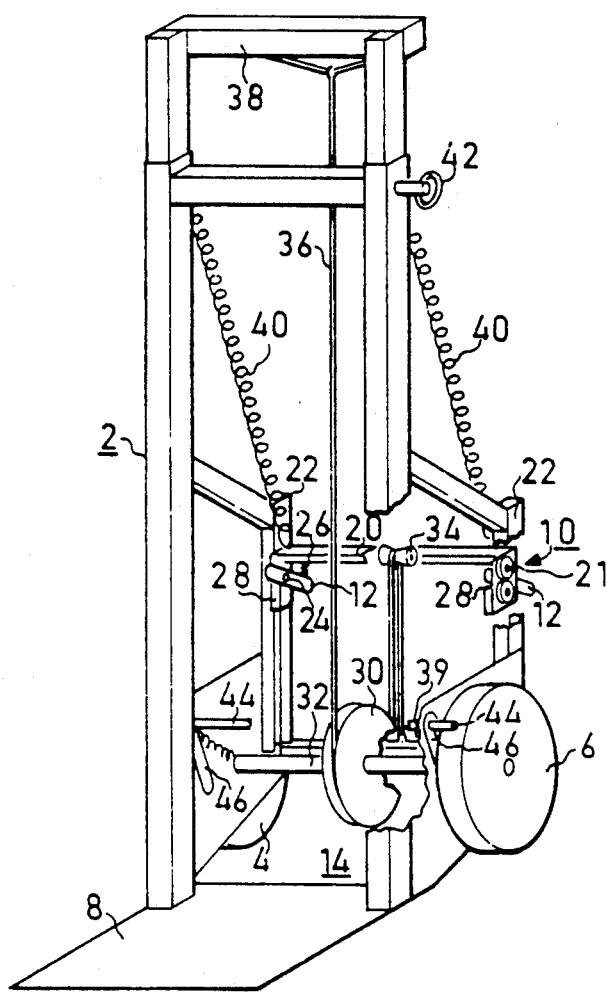

000
WHEELED VEHICLE INCLUDING STEP-TRAVERSING ARRANGMENT

FIELD AND BACKGROUND OF THE INVENTION

The present invention relates to wheeled vehicles, and particularly to such vehicles equipped with a step-traversing arrangement.

Many types of step-traversing arrangements have been provided for wheeled vehicles, such as handtrucks and wheelchairs, but as a rule the known arrangements require considerable force for lifting the vehicle over the step, and/or are relatively complicated and therefore expensive.

OBJECTS AND BRIEF SUMMARY OF THE INVENTION

An object of the present invention is to provide a wheeled vehicle with a step-traversing arrangement which requires a relatively small amount of force in order to traverse a step and which is of simple and relatively inexpensive construction.

According to the present invention, there is provided a wheeled vehicle including a frame, at least one wheel carried at the lower end of the frame for moving the vehicle over a surface, and a lifting device for lifting the vehicle over a step to be traversed; characterized in that the lifting device comprises a carriage mounted on the frame for vertical movement with respect thereto; lifting means carried by the carriage and engageable with the step to be traversed; and a force-multiplying assembly carried by the frame and coupled to the carriage for moving the carriage downwardly relative to the frame while the lifting means engages the top of the step to be traversed to thereby lift the frame over the step. The force-multiplying assembly further includes a drawbar slidably mounted at an upper end of the frame and coupled to the force-multiplying assembly; and a manual locking device for locking the drawbar to the frame to enable the draw bar to be used as a handle for moving the wheeled vehicle over a flat horizontal surface. The locking device is manually releasable from the frame for releasing the drawbar and thereby for permitting the drawbar also to be used for moving the carriage downwardly relative to the frame in a force-multiplying manner to lift the vehicle over a step.

It will thus be seen that the force-multiplying assembly, which is preferably a block and tackle assembly, enables a relatively small amount of force to be used in order to lift the vehicle over the step. The block and tackle assembly may be manually operated, thereby enabling a relatively simple and inexpensive lifting arrangement to be provided; alternatively, it could be electrically operated.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates a handtruck constructed in accordance with the present invention;

FIGS. 2a, 2b and 2c are diagrams illustrating the operation of the lifting assembly for traversing a step;

DESCRIPTION OF PREFERRED EMBODIMENTS

Figure 3:
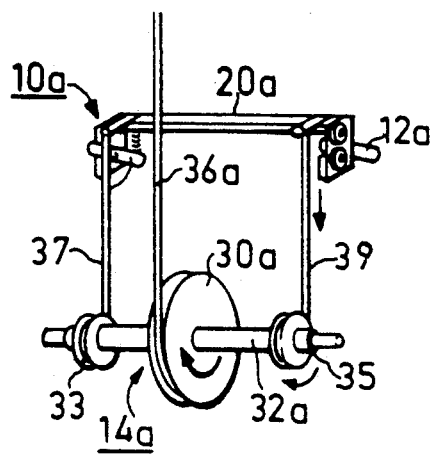
FIG. 3 illustrates a modification in the lifting carriage of FIG. 1.

The handtruck illustrated in FIG. 1 includes a frame, generally designated 2, provided with two wheels 4, 6 and a load platform 8 at its lower end. The foregoing elements may be of any construction conventionally provided in handtrucks as used for moving loads supported on its platform 8 over a floor, the ground, or other horizontal surface.

According to the present invention, the handtruck illustrated in FIG. 1 is provided with a lifting device for lifting it over a step or the like to be traversed. The lifting device comprises a carriage, generally designated 10, mounted on frame 2 for vertical movement with respect to the frame. Carriage 10 includes a pair of arms 12 on opposite sides of the carriage and engageable with the step to be traversed. The lifting means further includes a block and tackle force-multiplying assembly, generally designated 14, carried by the truck frame 2 and coupled to its carriage 10 for moving the carriage downwardly with respect to the frame while the lifting arms 12 engage the top of the step to be traversed, to thereby lift the frame over the step.

More particularly, carriage 10 includes a carriage bar 20 slidably mounted by rollers 21 for vertical movement between a pair of vertical channel members 22 secured to the frame 2. The two arms 12 are pivotally mounted at the opposite ends of carriage bar 20 at pivot points 24 and are urged by springs 26 against stops 28 underlying the arms, such that the arms may pivot (clockwise as shown in FIG. 1), but not counterclockwise because of their engagement with stops 28.

The block and tackle assembly 14 comprises a pulley wheel 30 rotatably mounted on a shaft 32 fixed transversely across the truck frame 2, and a second, smaller pulley wheel 34 rotatably mounted on carriage bar 20. The block and tackle assembly further includes a cable 36 fixed at its outer end to a drawbar 38 slidably mounted to the upper end of the truck frame 2. The opposite end of cable 36 is wound first over pulley 30 and then over pulley 34, and its opposite end is fixed to a shaft 39 of the truck frame 2. Carriage bar 20 is normally urged to its raised position by a pair of springs 40 secured between the upper end of the truck frame 2 and carriage bar 20.

More particularly, the frame 2 includes two frame bars 2a, 2b, and the drawbar 38 includes two legs 38a, 38b slidably mounted on the two frame bars 2a, 2b.

Drawbar 38 may be manually fixed to frame 2 by a rotatable knob 42 mounted on frame bar 2b and engageable with drawbar leg 38b, so that the drawbar may be used as the handle for moving the handtruck over a flat horizontal surface. When reaching a step to be traversed, knob 42 is manually loosened, permitting the drawbar 38 to be moved from its retracted position outwardly to an extended position with respect to the truck frame 2. Such outward movement of the drawbar 38 pays out the end of cable 36 attached to the drawbar, thereby shortening the stretch of the cable between the small pulley wheel 34 on the carriage bar 20 and shaft 39 fixed to the truck frame 2. This shortening of the latter stretch of cable 36 moves the carriage bar 20 downwardly between the vertical bars 22 of the truck frame 2, and thereby also moves downwardly the two arms 12 with respect to the truck frame 2.

The handtruck illustrated in FIG. 1 further includes a locking bar 44 for locking the wheels 4, 6 against rotation in one direction when descending a step. Thus, locking bar 44 is pivotally mounted to the truck frame 2 within a slot 46 to a locking condition against the two wheels 4, 6 when the wheels start to rotate in one direction (counter-clockwise in FIG. 1), or to a release condition when the wheels start to rotate in the opposite direction.

The manner of using the truck illustrated in FIG. 1 will now be described particularly with reference to the diagrams of FIGS. 2a, 2b and 2c.

During the normal use of the handtruck, knob 42 is in its tightened condition, thereby securing drawbar 38 in its retracted position to the truck frame 2, so that the drawbar may also be used as the handle for moving the truck over a horizontal surface by means of its wheels 4, 6 while carrying a load on its load platform 8. When encountering a step 48, the two arms 12 carried by the carriage bar 20 are aligned with the upper face of the step, and then knob 42 is manually loosened to permit the drawbar 38 to be moved outwardly to its extended position with respect to the truck frame 2.

The outward movement of drawbar 38 causes the end of cable 36 attached to the drawbar to pay out with respect to pulley 30, and thereby shortens the stretch of the cable between pulley 34 and shaft 39 of the truck frame. This causes the carriage bar 20 to move downwardly relative to the truck frame 2. Since the arms 12 at the ends of the carriage bar 20 engage the upper surface of the step 48, the truck frame 2, as well as the load carried thereby on its platform 8, is caused to move upwardly with respect to the carriage arms 12 and the step engaged thereby.

FIG. 2a illustrates the condition at the beginning of this lifting operation, wherein arms 12 engage the upper surface of the step 48. When the drawbar 38 is moved outwardly to pay out cable 36 with respect to pulley 30, this causes the truck frame 2 to move upwardly with a force multiplied by a factor equal to the number of stretches of the cable in the block and tackle assembly 14. In this case, there are three stretches of the cable, so that the multiplication factor is "3", neglecting friction losses.

As the handtruck is thus elevated by the block and tackle assembly 14 over the step, arms 12 are permitted to pivot clockwise about their pivot points 24, as shown in the diagrams of FIGS. 2b and 2c, until the step 48 is traversed, whereupon the arms 12 automatically pivot to their normal outward positions by springs 26.

After the handtruck has thus traversed the step, drawbar 38 is returned to its retracted position and knob 42 is manually tightened, so that the handtruck may thereafter be used in its normal way.

It will be seen that locking bar 44, movable in slot 46, permits the wheels to rotate clockwise, but not counter-clockwise. Accordingly, when the handtruck ascends a step, as illustrated in the diagrams of FIGS. 2a, 2c, the locking bar permits the wheels to rotate clockwise for ascending the step, but prevents the wheels from rotating counter-clockwise, and thereby prevents inadvertent rolling back of the handtruck. It will also be seen from FIGS. 2a–2c that the pivotal mountings of the lifting arms 12, which permit the arms to pivot clockwise but not counter-clockwise, also aid in preventing the handtruck from accidentally falling back.

FIG. 3 illustrates a modified construction for the carriage, therein designated 10a, and the force-multiplying block and tackle assembly, therein designated 14a. Thus, in the modification illustrated in FIG. 3, the carriage 10a is similarly constructed as in FIG. 1, including a pair of arms 12a pivotally mounted at the opposite ends of the carriage bar 20a, as in FIG. 1. The block and tackle assembly 14a also includes a pulley 30a mounted on a shaft 32a extending transversely across the truck frame, and a cable 36a wound around the pulley 30a. However, in the modification illustrated in FIG. 3, pulley 30a is fixed to shaft 32a, and the shaft is rotatably mounted to the truck frame and includes a pair of smaller pulleys 33, 35 fixed to the shaft 32a on opposite sides of pulley 30a. A second cable 37 is fixed at one end to pulley 33 and at the opposite end to carriage bar 20a, and a third cable 39 is fixed at one end to pulley 35 and at the opposite end to carriage bar 20a.

Thus, when cable 36a is pulled out by moving the drawbar 38 (FIG. 1) to its extended position, pulley 30a is rotated according to the length of the cable pulled out, and this rotation of pulley 30a is transmitted by shaft 32a to rotate pulleys 33 and 35, which thereby shortens cables 37 and 39 to pull down carriage bar 20a.

In all other respects, the modification illustrated in FIG. 3 involves the same structure and mode of operation as described above with respect to FIG. 1, except that the force-multiplying factor in the arrangement of FIG. 3 is equal to the ratio of the diameter of pulley 30a with respect to those of pulleys 33, 35, plus one. Accordingly, any desired multiplification factor may be provided by appropriately selecting the diameters of pulleys 33, 35 with respect to that of pulley 30a.

Figure 4:
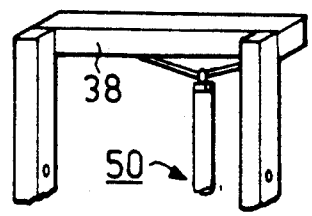
FIG. 4 illustrates the handtruck of FIG. 1 equipped with a dashpot device for aiding in descending a step.
Figure 5:
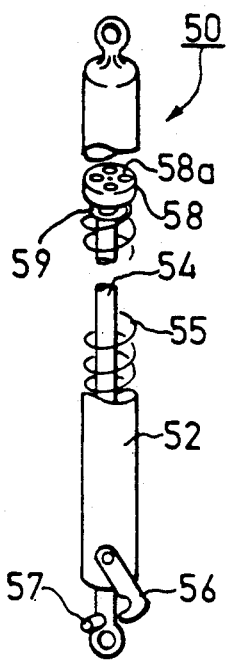
FIG. 5 more particularly illustrates the construction of the dashpot device in the handtruck of FIG. 4.

A dashpot device, as illustrated in FIGS. 4 and 5, may be included in the handtruck of FIG. 1, or in the modification of FIG. 3, in order to assist the handtruck, with a load carried by its platform 8, to descend a step. FIG. 4 illustrates the dashpot device, generally designated 50, mounted on the handtruck of FIG. 1, and FIG. 5 more particularly illustrates the construction of the dashpot device 50. To facilitate understanding, the various elements of the handtruck illustrated in FIG. 4 are identified by the same reference numerals as in FIG. 1.

Thus, as shown in FIG. 4, the dashpot device 50 is connected to the end of cable 36 between the large pulley 30 and the drawbar 38. The dashpot device includes an outer cylinder 52 secured to the drawbar 38, an inner plunger 54 secured to the outer end of cable 36, and an internal spring 55 urging plunger 54 to its inner, retracted position with respect to cylinder 52. Plunger 54 may be retained in its retracted position by a hook 56 pivotally mounted to the cylinder 52 and engageable with a pin 57 carried by the plunger 54.

The extension movements of plunger 54 (in the outward direction with respect to the cylinder 52) are restrained by openings 58a formed in the plunger head 58, and a disc 59 freely mounted on the plunger between its head 58 and its pin 57. Disc 59 is of a diameter to partially cover the openings 58a formed in the plunger head 58, such that when cylinder 52 is moved outwardly with respect to the plunger 54, the low pressure produced between the closed end of the cylinder and the plunger head 58 draws disc 59 against the plunger head 58 to partially close the openings 58a, thereby restraining the extension movement of the plunger relative to the cylinder. However, when the plunger is moved inwardly, to its retracted position, with respect to cylinder 52, disc 59 moves away from plunger head 58, thereby producing an unrestrained retraction movement of the plunger with respect to the cylinder.

The fluid included within the cylinder may be air or a liquid such as oil.

When the handtruck illustrated in FIG. 4 is moved over a horizontal surface, drawbar 38 is retracted, knob 42 is tightened, and hook 56 is moved to engage pin 57 to thereby lock plunger 54 in its retracted position within cylinder 52, so that the handtruck would be used in the same manner as described above with respect to FIGS. 1-3. When the handtruck is to ascend a step, knob 42 is loosened, to permit the drawbar 38, together with the lifting arms 12 engaging the upper face of the step, to raise the frame above the step in the same manner as described above with respect to FIG. 1.

However, when the handtruck is to descend a step, knob 42 is loosened, drawbar 38 is manually moved outwardly to thereby lower the lift arms 12 of the carriage bar 20 with respect to the truck frame 2, and knob 42 is then tightened. Hook 56 is then released from pin 57. The truck is then inclined and moved towards the lower step. Inclining the truck causes the arms 12 to engage the higher step, and as the load platform 8 and wheels 4, 6 overlie the lower step, plunger 54 moves outwardly (downwardly) with respect to cylinder 52, whereby the truck frame 2, including its wheels 4, 6 and load platform 8, move downwardly until the load platform engages the step below. This downward movement of the truck frame is restrained by the restricted flow of the fluid through openings 58a in plunger head 58 caused by the movement of disc 59 against the plunger head.

Figure 6:
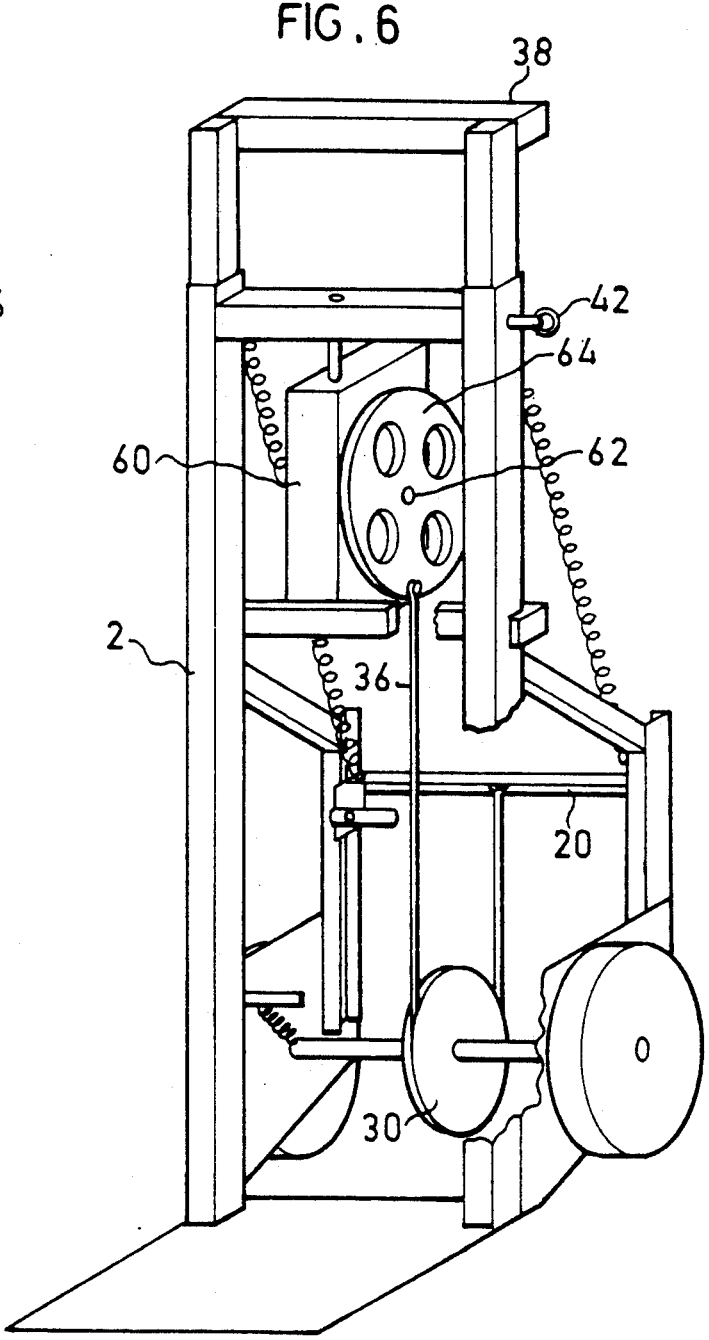
FIG. 6 illustrates a handtruck equipped with an electrically-operated lifting mechanism.

FIG. 6 illustrates a handtruck including an electric motor for electrically operating the block and tackle assembly rather than manually operating it when traversing a step. The handtruck illustrated in FIG. 6 may be of substantially the same construction as described above with respect to FIG. 1, and therefore the same reference numerals have been used for identifying its parts in order to facilitate understanding.

As shown in FIG. 6, the electric motor is contained within a housing 60 secured to the upper end of the truck frame 2, and includes an output rotary shaft 62 for rotating a disc 64. The outer end of cable 36 of the block and tackle assembly is fixed eccentrically to disc 64, so that the rotation of the disc by the electric motor within housing 60 pays out the cable with respect to the large pulley wheel 30.

Since power for lifting the handtruck is now supplied by the electric motor within housing 60, the block and tackle assembly illustrated in FIG. 6 is shown as of a type providing a multiplication factor of only "2" rather than "3" as in FIG. 1. Thus, the inner end of cable 36 is secured directly to the carriage bar 20, rather than being wound over another pulley wheel (34, FIG. 1) carried by the carriage bar, so that there are only two stretches of cable of the block and tackle assembly of FIG. 6, rather than three stretches.

In all other respects, the construction and operation of the handtruck illustrated in FIG. 6 may be the same as described above in FIG. 1, as well as in FIGS. 3, 4 and 5.

While the invention has been described so far with respect to handtrucks, it will be appreciated that the invention could also be included in many other types of wheeled vehicles, such as in wheelbarrows including only one wheel, or wheelchairs including four wheels. An example of the latter is illustrated in FIG. 7.

Figure 7:
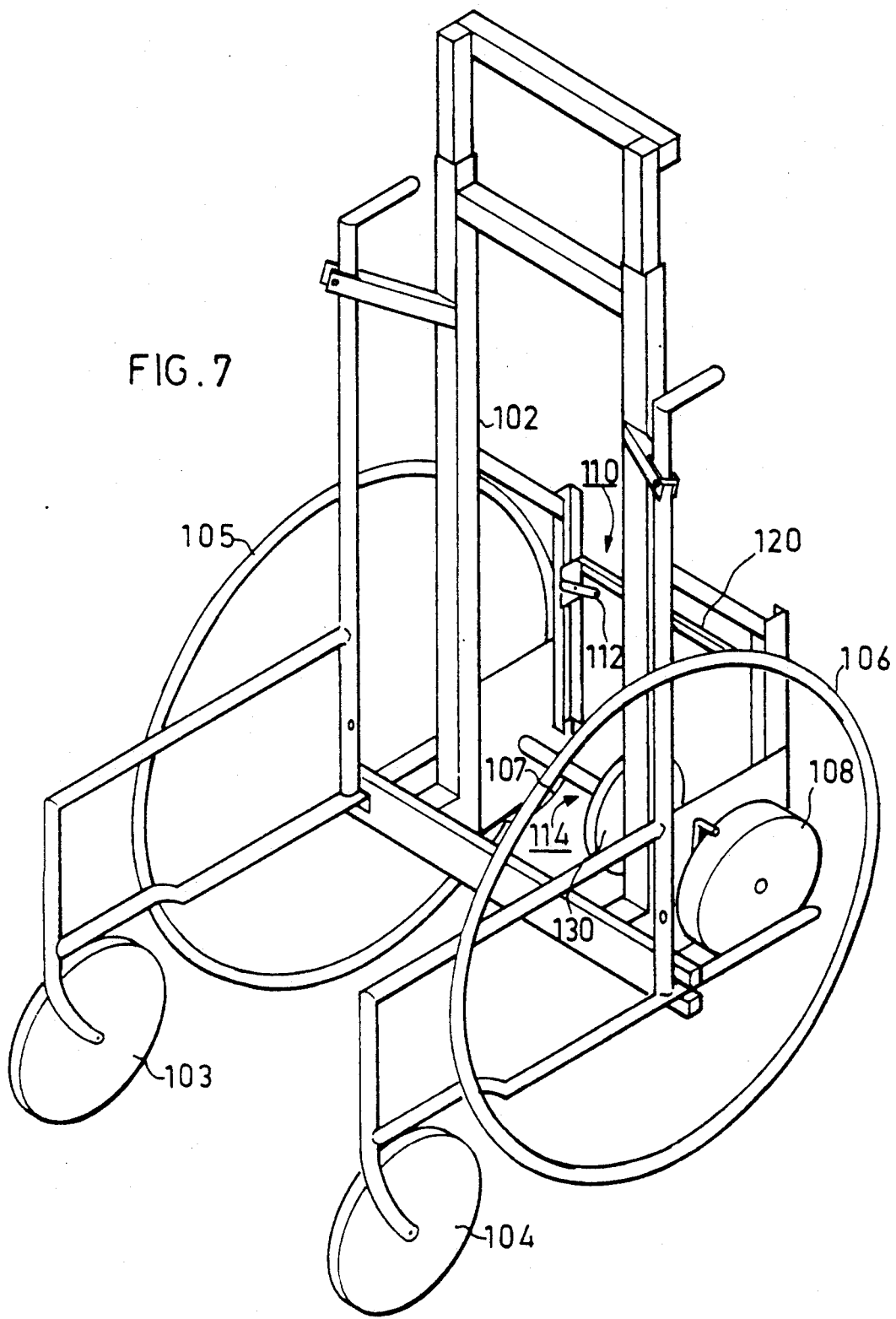
FIG. 7 illustrates a wheelchair including a lifting assembly in accordance with the present invention.

The wheelchair illustrated in FIG. 7 may be of any conventional construction and includes a frame 102 mounted on four wheels 103, 104, 105 and 106. The illustrated wheelchair is provided with two additional wheels 107, 108, and with a carriage, generally designated 110. Carriage 110 is similar to carriage 10 in FIG. 1 and includes a pair of lifting arms 112 and a block and tackle assembly, generally designated 114, for moving the carriage downwardly with respect to the frame while the arms 112 engage the top of the step to be traversed.

For the sake of simplicity, FIG. 7 illustrates only the carriage bar 120 and one lifting arm 112 of the carriage 110, and only the large pulley 130 of the block and tackle assembly 114. It will be appreciated, however, that the construction and operation of the carriage, its lifting arms, and its block and tackle assembly, may otherwise be the same as described above with respect to FIG. 1 or 3, and could also include the dashpot illustrated in FIGS. 4 and 5, as well as the electric motor drive as illustrated in FIG. 6.

While the invention has been described with respect to several preferred embodiments, these are shown purely for purposes of example, and many other variations, modifications and applications of the invention may be made. For example, other force-multiplying arrangements, such as a gearing and the like could be used for lifting the frame.

What is claimed is:

1. A wheeled vehicle including a frame, at least one wheel carried at a lower end of the frame for moving the vehicle over a surface, and a lifting device for lifting the vehicle over a step to be traversed; characterized in that said lifting device comprises:
    a carriage mounted on said frame for vertical movement with respect thereto;
    lifting means carried by said carriage and engageable with the step to be traversed;
    a force-multiplying assembly carried by the frame and coupled to said carriage for moving the carriage downwardly relative to said frame while said lifting means engages the top of the step to be traversed to thereby lift the frame over the step;
    a drawbar slidably mounted to an upper end of said frame and only having limited longitudinal sliding movement relative thereto, said drawbar operatively coupled to said force-multiplying assembly;
    and a manual locking device for locking said drawbar to said frame to enable the drawbar to be used as a handle for moving the wheeled vehicle over a flat horizontal surface; said locking device being manually releasable from said frame for releasing said drawbar and thereby for permitting the drawbar also to be used for moving the carriage downwardly relative to said frame via the force-multiplying assembly to lift the vehicle over a step.

2. The wheeled vehicle according to claim 1, wherein said lifting means comprises a pair of arms pivotally mounted on the opposite sides of the carriage.

3. The wheeled vehicle according to claim 1, wherein said force-multiplying assembly comprises a pulley wheel carried by the frame, and a cable wound over said pulley wheel; one end of said cable being coupled to said drawbar and payable outwardly from the pulley wheel to shorten the other end of the cable, said other end of the cable being coupled to said carriage to move it downwardly with respect to the frame to lift the frame over the step.

4. The wheeled vehicle according to claim 1, wherein said upper end of the frame includes two frame bars, and said drawbar includes two legs slidably mounted on said two frame bars and lockable thereto by said manual locking device.

5. The wheeled vehicle according to claim 4, further including a spring for urging the carriage to an upper position and the drawbar to its retracted position with respect to the frame.

6. The wheeled vehicle according to claim 4, wherein said manual locking device includes a rotatable knob mounted on one of said frame bars and lockable with respect to one of said legs of the drawbar.

7. The wheeled vehicle according to claim 1, further including a dashpot device between the carriage and frame for restraining the movement of the frame with respect to the carriage when descending a step.

8. The wheeled vehicle according to claim 7, wherein said dashpot device includes a plunger movable within a cylinder to a retracted position or to an extended position, a spring normally urging the plunger to its retracted position with respect to the cylinder, an orifice partially closed by a disc for restraining the movement of the plunger to its extended position with respect to the cylinder but permitting unrestrained movement to its retracted position within the cylinder, and a locking element for locking the plunger in its retracted position.

9. The wheeled vehicle according to claim 1, further including a locking bar locking said at least one wheel against rotation in one direction, and permitting its rotation in the opposite direction.

10. The wheeled vehicle according to claim 1, further including a one-way brake permitting said wheel to rotate in the direction of ascending the steps, and blocking the wheel from rotating in the direction of descending the steps.

11. The wheeled vehicle according to claim 1, wherein the wheeled vehicle is a two-wheeled handtruck.

12. The wheeled vehicle according to claim 1, wherein the wheeled vehicle is a four-wheeled wheelchair.

13. A wheeled vehicle including:
a frame;
at least one wheel carried at a lower end of the frame for moving the vehicle over a surface;
a carriage mounted on said frame for vertical movement with respect thereto;
a lifting arm pivotally mounted to the carriage;
a block and tackle assembly carried by the frame and coupled to said carriage for moving the carriage downwardly relative to said frame while said lifting arm engages the top of the step to be traversed to thereby lift the frame over the step;
a drawbar slidably mounted to an upper end of said frame and only having limited longitudinal sliding movement relative thereto, said drawbar operatively coupled to said block and tackle assembly;
and a manual locking device for locking said drawbar to said frame to enable the drawbar to be used as a handle for moving the wheeled vehicle over a flat horizontal surface; said locking device being manually releasable from said frame for releasing said drawbar and thereby for permitting the drawbar also to be used for moving the carriage downwardly relative to said frame via the block and tackle assembly to lift the vehicle over a step.

14. The wheeled vehicle according to claim 13, wherein said block and tackle assembly comprises a pulley wheel carried by the frame, and a cable wound over said pulley wheel; one end of said cable being payable outwardly from the pulley wheel to shorten the other end of the cable, said other end of the cable being coupled to said carriage to move it downwardly with respect to the frame to lift the frame over the step.

15. The wheeled vehicle according to claim 13, further including a spring for urging the carriage to an upper position and the drawbar to a retracted position with respect to the frame, and said manual locking device includes a rotatable knob for locking the drawbar in its retracted position with respect to said frame.

16. The wheeled vehicle according to claim 13, further including a dashpot device between the carriage and frame for restraining the movement of the frame with respect to the carriage when descending a step.

17. The wheeled vehicle according to claim 16, wherein said dashpot device includes a plunger movable within a cylinder either to a retracted position or to an extended position, a restricted orifice for restraining the movement of the plunger with respect to the cylinder towards said extended position but not towards said retracted position, and a locking element for locking the plunger in its retracted position.

18. The wheeled vehicle according to claim 13, further including a locking bar locking said at least one wheel against rotation in one direction, and permitting its rotation in the opposite direction.

* * * * *